US012676031B2

(12) United States Patent (10) Patent No.: US 12,676,031 B2
Otani et al. (45) Date of Patent: Jul. 7, 2026

(54) FUNCTION MANAGEMENT SYSTEM AND FUNCTION MANAGEMENT METHOD

(71) Applicant: HONDA MOTOR CO., LTD., Tokyo (JP)

(72) Inventors: Kyohei Otani, Tokyo (JP); Takashi Tsujioka, Tokyo (JP); Tadahiko Kanoh, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 18/543,697

(22) Filed: Dec. 18, 2023

(65) Prior Publication Data

US 2024/0257579 A1    Aug. 1, 2024

(30) Foreign Application Priority Data

Jan. 26, 2023    (JP) ................................ 2023-010383

(51) Int. Cl.
    *G07C 5/00*     (2006.01)
    *G06F 8/61*     (2018.01)
    *G07C 5/08*     (2006.01)
(52) U.S. Cl.
    CPC .............. *G07C 5/008* (2013.01); *G06F 8/61* (2013.01); *G07C 5/0808* (2013.01); *G07C 5/085* (2013.01)
(58) Field of Classification Search
    CPC ...... G07C 5/008; G07C 5/0808; G07C 5/085; G06F 8/61; B60R 16/023; B60R 16/0232; B60Q 9/00
    See application file for complete search history.

(56) References Cited

U.S. PATENT DOCUMENTS

| | | | |
|---|---|---|---|
| 2017/0021835 A1* | 1/2017 | Kojima ................. | B60W 10/20 |
| 2018/0170256 A1 | 6/2018 | Medenica et al. | |
| 2021/0362732 A1 | 11/2021 | Sakurada et al. | |

FOREIGN PATENT DOCUMENTS

| | | | |
|---|---|---|---|
| JP | 2007-15505 A | 1/2007 | |
| JP | 2018-140766 A | 9/2018 | |
| JP | 2021-189491 A | 12/2021 | |
| JP | 2022-7618 A | 1/2022 | |
| JP | 2022-73600 A | 5/2022 | |

OTHER PUBLICATIONS

Japanese Office Action Corresponding to Application No. JP 2024147578.A dated Apr. 1, 2025, 11 pages.

* cited by examiner

*Primary Examiner* — Michael V Kerrigan
(74) *Attorney, Agent, or Firm* — Rankin, Hill & Clark LLP

(57) ABSTRACT

A function management system includes: an information collection unit configured to collect failure information including information about a failure of an electronic controller loaded in the vehicle and/or information about a failure of an instrument controlled by the electronic controller; and a determination unit configured to determine whether or not execution preparation for utilization start is possible for each of the option functions, and the determination unit determines that the execution preparation of the option function is impossible when a failure has been found in the electronic controller or the instrument required for execution of the option function, for each of the option functions, based on the failure information.

9 Claims, 8 Drawing Sheets

PREPARATION DETERMINATION PROCESSING

FIG.6

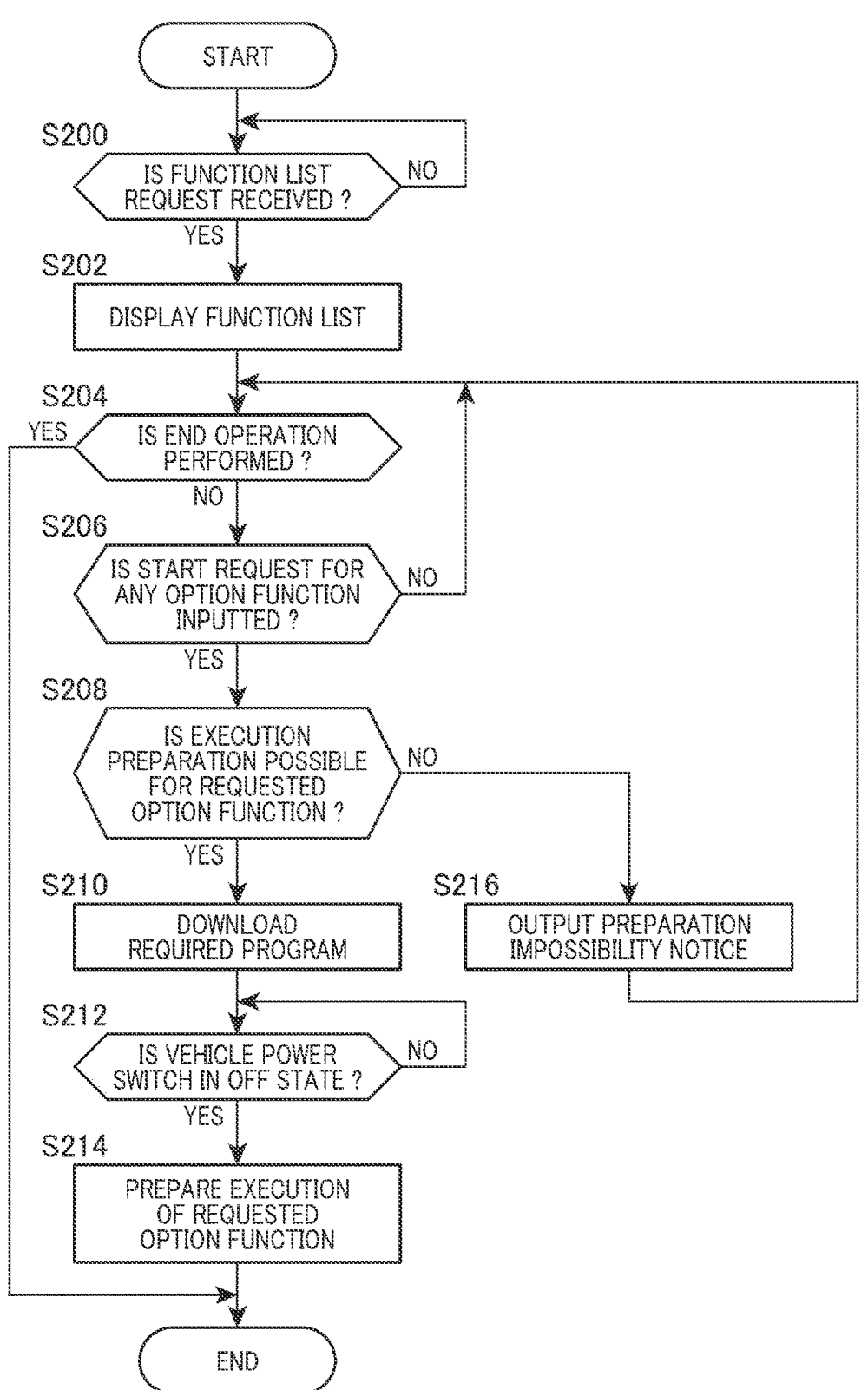

FUNCTION START PROCESSING

START

S200 — IS FUNCTION LIST REQUEST RECEIVED ?  NO

YES

S202 — DISPLAY FUNCTION LIST

S204 — IS END OPERATION PERFORMED ?  YES

NO

S206 — IS START REQUEST FOR ANY OPTION FUNCTION INPUTTED ?  NO

YES

S208 — IS EXECUTION PREPARATION POSSIBLE FOR REQUESTED OPTION FUNCTION ?  NO

YES

S210 — DOWNLOAD REQUIRED PROGRAM

S216 — OUTPUT PREPARATION IMPOSSIBILITY NOTICE

S212 — IS VEHICLE POWER SWITCH IN OFF STATE ?  NO

YES

S214 — PREPARE EXECUTION OF REQUESTED OPTION FUNCTION

END

FIG. 7

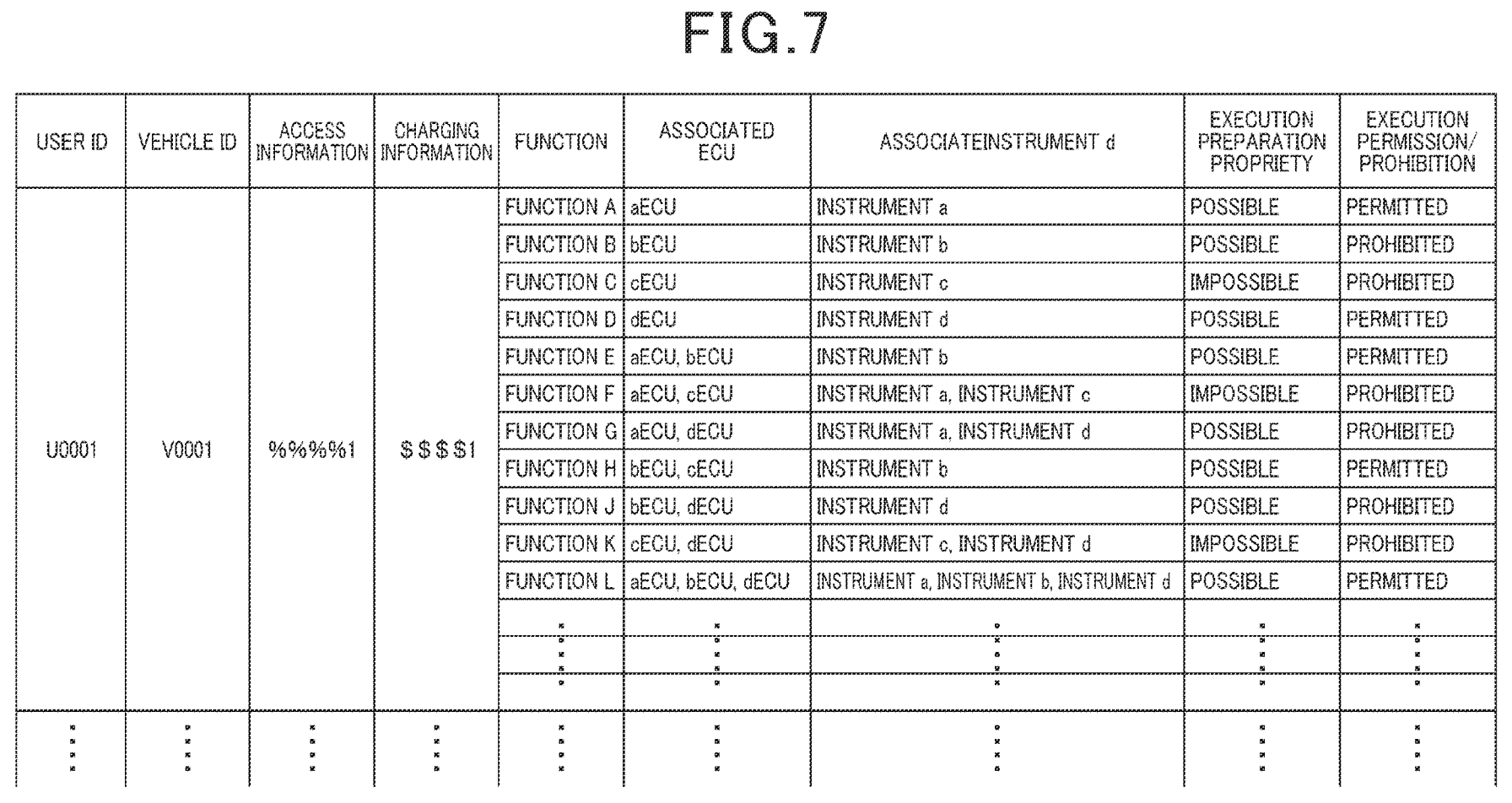

| USER ID | VEHICLE ID | ACCESS INFORMATION | CHARGING INFORMATION | FUNCTION | ASSOCIATED ECU | ASSOCIATE INSTRUMENT | EXECUTION PREPARATION PROPRIETY | EXECUTION PERMISSION/ PROHIBITION |
|---|---|---|---|---|---|---|---|---|
| U0001 | V0001 | %%%%%1 | $$$$1 | FUNCTION A | aECU | INSTRUMENT a | POSSIBLE | PERMITTED |
| | | | | FUNCTION B | bECU | INSTRUMENT b | POSSIBLE | PROHIBITED |
| | | | | FUNCTION C | cECU | INSTRUMENT c | IMPOSSIBLE | PROHIBITED |
| | | | | FUNCTION D | dECU | INSTRUMENT d | POSSIBLE | PERMITTED |
| | | | | FUNCTION E | aECU, bECU | INSTRUMENT b | POSSIBLE | PERMITTED |
| | | | | FUNCTION F | aECU, cECU | INSTRUMENT a, INSTRUMENT c | IMPOSSIBLE | PROHIBITED |
| | | | | FUNCTION G | aECU, dECU | INSTRUMENT a, INSTRUMENT d | POSSIBLE | PROHIBITED |
| | | | | FUNCTION H | bECU, cECU | INSTRUMENT b | POSSIBLE | PERMITTED |
| | | | | FUNCTION J | bECU, dECU | INSTRUMENT d | POSSIBLE | PROHIBITED |
| | | | | FUNCTION K | cECU, dECU | INSTRUMENT c, INSTRUMENT d | IMPOSSIBLE | PROHIBITED |
| | | | | FUNCTION L | aECU, bECU, dECU | INSTRUMENT a, INSTRUMENT b, INSTRUMENT d | POSSIBLE | PERMITTED |
| | | | | ..... | ..... | ..... | ..... | ..... |
| | ..... | ..... | ..... | ..... | ..... | ..... | ..... | ..... |
| ..... | ..... | | | | | | | |

FUNCTION MANAGEMENT SYSTEM AND FUNCTION MANAGEMENT METHOD

INCORPORATION BY REFERENCE

The present application claims priority under 35 U.S.C. § 119 to Japanese Patent Application No. 2023-010383 filed on Jan. 26, 2023. The content of the application is incorporated herein by reference in its entirety.

BACKGROUND OF THE INVENTION

Field of the Invention

The present invention relates to a function management system that manages utilization of an option function in a vehicle, and a function management method.

Description of the Related Art

In recent years, an approach of providing access to a sustainable transportation system considering even vulnerable people among traffic participants is gaining momentum. Towards the realization, the focus is on research and development for further improving traffic safety and convenience through research and development regarding a driving assist technique.

Further, in recent years, devices and instruments capable of realizing option functions are loaded in a vehicle beforehand in addition to devices for realizing standard functions in the vehicle when selling the vehicle to make it possible to execute the option functions according to a request from a user after the vehicle is sold.

Japanese Patent Laid-Open No. 2021-189491 describes an information processor which changes utilization setting of an option loaded in a vehicle according to an intended purpose. In the information processor, all the options can be utilized when the intended purpose of the vehicle is business use, and utilization of at least one option is limited when the intended purpose of the vehicle is private use.

Now, in the driving assist technique, a problem is to appropriately manage failures of devices and instruments relating to option functions of a vehicle and smoothly prepare for execution of the option functions in order to improve convenience of a vehicle user.

In order to solve the above-described problem, an object of the present application is to quickly present propriety of execution preparation of an option function to a user when utilization of the option function is requested from a vehicle user and facilitate option function utilization, thereby contributing to development of a sustainable transportation system.

SUMMARY OF THE INVENTION

One aspect of the present invention is a function management system which manages utilization of option functions in a vehicle, the function management system includes: an information collection unit configured to collect failure information including information about a failure of an electronic controller loaded in the vehicle and/or information about a failure of an instrument controlled by the electronic controller; and a determination unit configured to determine whether or not execution preparation for utilization start is possible for each of the option functions, and the determination unit determines that the execution preparation of the option function is impossible when a failure has been found in the electronic controller or the instrument required for execution of the option function, for each of the option functions, based on the failure information.

According to another aspect of the present invention, a reception unit configured to receive a request for the utilization start for the option functions from a terminal device and a notification unit configured to notify a user via the terminal device are provided, and the notification unit outputs a notice indicating that the option function cannot be utilized to the user via the terminal device when the execution preparation is determined to be impossible for the option function, when the reception unit receives the request for the utilization start for one of the option functions.

According to another aspect of the present invention, a notification unit configured to present a list of the option functions to a user via a terminal device is provided, and the notification unit presents the option functions for which the execution preparation is determined to be possible, and does not present the option functions for which the execution preparation is determined to be impossible, in the list.

According to another aspect of the present invention, the electronic controller makes a self-diagnosis for an operation failure of the electronic controller and/or a failure diagnosis for the instrument controlled by the electronic controller and generates the failure information, and the information collection unit collects the failure information from the electronic controller and transmits the failure information to the determination unit when a power switch of the vehicle is switched ON.

According to another aspect of the present invention, the information collection unit further transmits, to the determination unit, the failure information received from the electronic controller which has found a failure of the electronic controller and/or the instrument in a period during which the power switch of the vehicle is ON.

According to another aspect of the present invention, an installation management unit configured to manage installation of a software program required for execution of the option function to the electronic controller is provided, and the installation management unit installs the software program of the option function for which the execution preparation is determined to be possible, and does not install the software program of the option function for which the execution preparation is determined to be impossible.

According to another aspect of the present invention, the installation management unit installs the software program required for the execution of the option function to the electronic controller in a period during which a power switch of the vehicle is turned OFF.

According to another aspect of the present invention, the function management system includes: a vehicle management device loaded in the vehicle and provided with the information collection unit; and a management server which is a server device provided outside the vehicle and provided with the determination unit.

Another aspect of the present invention is a function management method performed by a computer of a function management system which manages utilization of option functions in a vehicle, the function management method includes: an information collection step of collecting failure information including information about a failure of an electronic controller loaded in the vehicle and/or information about a failure of an instrument controlled by the electronic controller; and a determination step of determining whether or not execution preparation for utilization start is possible for each of the option functions, and in the determination step, the execution preparation of the option function is determined to be impossible when a failure has been found in the electronic controller or the instrument required for execution of the option function, for each of the option functions, based on the failure information.

According to the present invention, propriety of execution preparation of an option function is quickly presented to a user when utilization of the option function is requested from a vehicle user, and option function utilization is facilitated.

BRIEF DESCRIPTION OF THE DRAWINGS

FIG. 6 is a flowchart illustrating a procedure of function start processing executed by the function management system;

FIG. 7 is a diagram illustrating one example of management information; and

DETAILED DESCRIPTION OF THE PREFERRED EMBODIMENTS

Hereinafter, embodiments of the present invention will be explained with reference to the drawings.

1. Configuration of Function Management System

Figure 1:
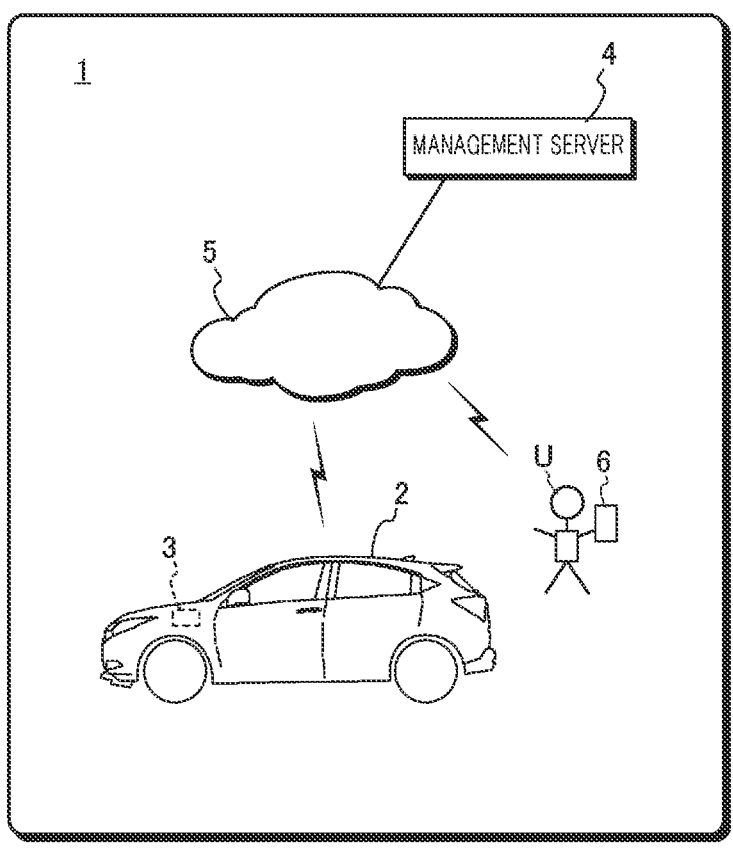
FIG. 1 is a diagram illustrating a configuration of a function management system according to one embodiment of the present invention.

FIG. 1 is a diagram illustrating the configuration of a function management system 1 according to one embodiment of the present invention. The function management system 1 includes a vehicle management device 3 loaded in a vehicle 2, a management server 4 which is a server device provided outside the vehicle 2, and a terminal device 6 possessed by a user U who utilizes the vehicle 2. The vehicle management device 3, the management server 4 and the terminal device 6 are connected so as to be capable of communicating with each other via a communication network 5 such as the Internet, for example.

The vehicle 2 is a vehicle which is motor-driven or driven by an internal combustion engine, for example. The terminal device 6 may be a portable or mobile terminal device such as a smartphone, a tablet PC and a notebook PC and a stationary terminal device such as a desktop PC. In the present embodiment, the terminal device 6 is a smartphone possessed by the user U, for example.

The user U selects an option function of the vehicle 2 by operating the terminal device 6, and transmits a request for the utilization start to the management server 4. In response to reception of the request for the utilization start, the management server 4 instructs execution preparation of the option function specified by the request to the vehicle management device 3 of the vehicle 2.

2. Operation Outline of Function Management System

The function management system 1 executes preparation determination processing and function start processing.

The preparation determination processing is the processing of determining whether or not the execution preparation for the utilization start is possible for each of the option functions. In addition, the function start processing is the processing of preparing so as to be capable of executing the option function specified by the request in the vehicle 2 in response to the request from the user U. Here, the execution preparation of the option function may include installing a software program required for execution of the option function to an associated electronic controller and/or giving a permission to execute the option function to the associated electronic controller (or setting the permission for the execution for the option function to the associated electronic controller).

In the preparation determination processing, the vehicle management device 3 collects failure information including information about a failure of electronic controllers provided in the vehicle 2 and information about a failure of instruments controlled by the electronic controllers. The management server 4 acquires the failure information from the vehicle management device 3, and determines whether or not the execution preparation for the user U to start utilization is possible for each of the option functions of the vehicle 2 based on the failure information. For example, the management server 4 determines that the execution preparation of the option function is impossible when a failure has been found in the electronic controller or the instrument required for the execution of the option function, for each of the option functions, based on the failure information. The management server 4 stores a determination result of execution preparation propriety for each option function as management information.

Thus, in the function management system 1, since the option function for which the execution preparation cannot be performed due to a failure of the electronic controller or the instrument can be detected prior to a request to utilize the option function from the user U, the propriety of the execution preparation of the option function can be quickly presented to the user and option function utilization can be facilitated.

In the function start processing, the management server 4 displays a list of the option functions at the terminal device 6 according to the request from the user U via the terminal device 6. The user U can select a desired option function from the list and request the utilization start. In response to the reception of the request to start the utilization for one of the option functions from the terminal device 6, the management server 4 refers to the determination result of the execution preparation propriety stored in the preparation determination processing, and determines whether or not the execution preparation is possible for the option function for which the utilization start is requested. Then, when the execution preparation is impossible for the option function, the management server 4 notifies the user U of the fact that the option function cannot be utilized, via the terminal device 6.

On the other hand, when the execution preparation is possible for the option function for which the utilization start is requested, the management server 4 performs charging processing for a utilization charge of the option function and then instructs the execution preparation for the option function to the vehicle management device 3. The utilization charge is, for example, a monthly utilization charge for each option function. The vehicle management device 3 which receives the execution preparation instruction installs the software program required for the execution of the option function for which the utilization start is requested to the electronic controller associated with the option function.

In the present embodiment, in particular, the vehicle management device 3 installs the software program of the option function for which the execution preparation is determined to be possible according to the execution preparation instruction for the option function, and does not install the software program of the option function for which it is determined the execution preparation is impossible.

Thus, unnecessary software program installation is avoided and processing loads of the vehicle management device 3 and processing loads of the electronic controller can be reduced.

Hereinafter, the configurations of the vehicle management device 3, the management server 4 and the terminal device 6 will be successively explained.

3. Configuration of Vehicle Management Device

First, the vehicle management device 3 provided in the vehicle 2 will be explained.

Figure 2:
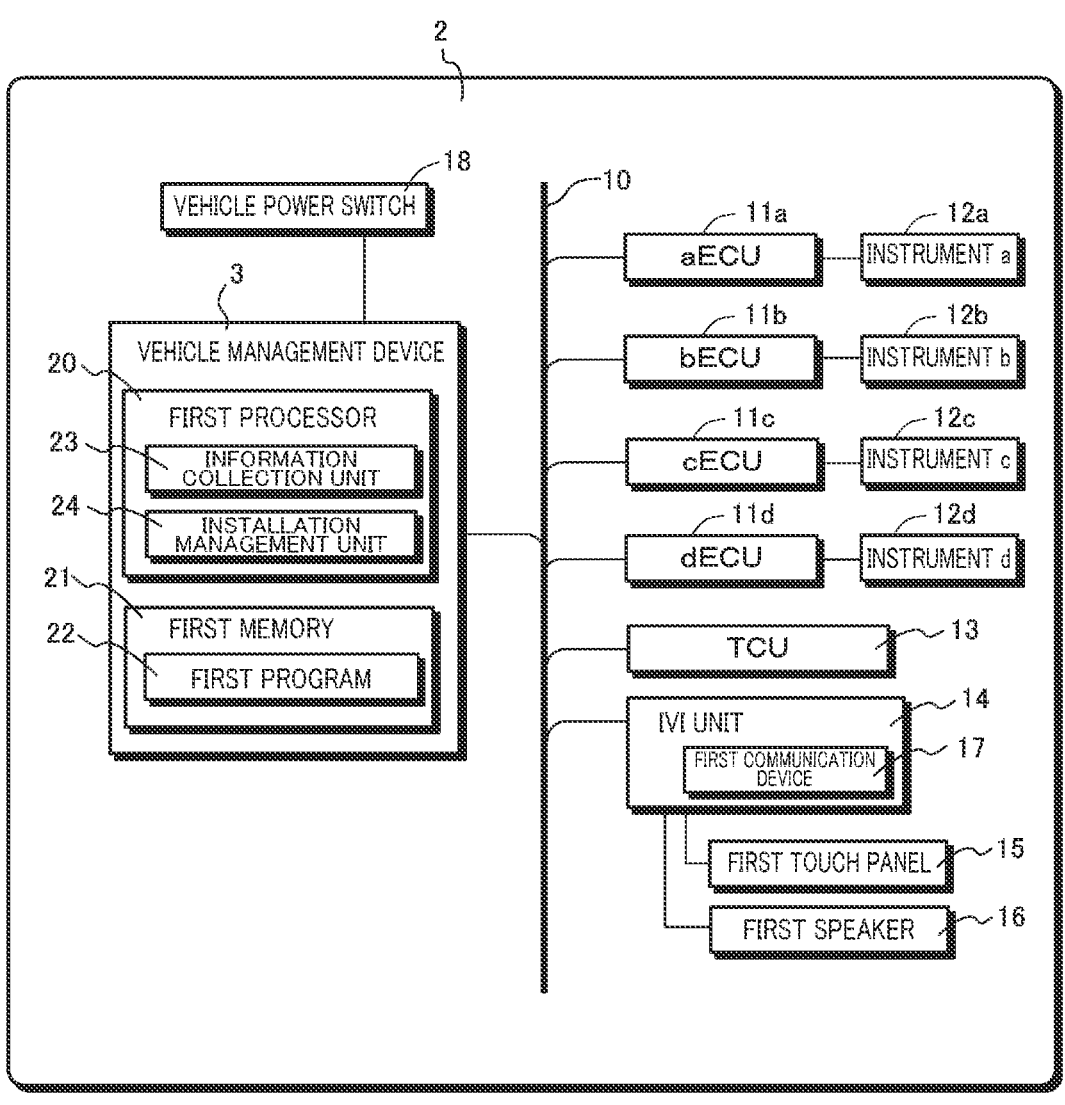
FIG. 2 is a diagram illustrating a configuration of a vehicle management device configuring the function management system.

FIG. 2 is a diagram illustrating the configuration of the vehicle management device 3. The vehicle management device 3 is communicably connected with an aECU (Electronic Control Unit) 11a, a bECU 11b, a cECU 11c, a dECU 11d, a TCU (Telematics Control Unit) 13, and an IVI (In-Vehicle Infotainment) unit 14, via an in-vehicle network bus 10 provided in the vehicle 2.

The aECU 11a, the bECU 11b, the CECU 11c and the dECU 11d are the electronic controllers in the present disclosure, and control an instrument a 12a, an instrument b 12b, an instrument c 12c and an instrument d 12d, respectively. Hereinafter, the aECU 11a, the bECU 11b, the cECU 11c and the dECU 11d are generically called ECUs 11 as well, and the instrument a 12a, the instrument b 12b, the instrument c 12c and the instrument d 12d are generically called instruments 12 as well. Each ECU 11 includes a processor that can execute various option functions of the vehicle 2 independently or in cooperation with the other ECUs 11.

Each of the ECUs 11 makes a self-diagnosis for its own operation failure and a failure diagnosis for the instrument 12 controlled by each and generates failure information indicating the diagnosis result periodically at predetermined timing for example, in a period during which a vehicle power switch 18 is in an ON state and power is supplied. Each ECU 11 transmits the generated failure information to the vehicle management device 3. Here, the failure may include abnormality of software and/or a failure of hardware.

The TCU 13 includes a wireless communication device for communicating with the management server 4 and the terminal device 6 via the communication network 5. The IVI unit 14 provides information of route guidance or the like and provides entertainments such as music and movies by displaying images and video images on a first touch panel 15 and outputting sound from a first speaker 16 according to an instruction from the user U via the first touch panel 15. The IVI unit 14 may also include a first communication device 17 which performs communication by short-range wireless such as Bluetooth® or cable communication via USB® with the terminal device 6 brought into interior of the vehicle 2. The IVI unit 14 may include an antenna. The first communication device 17 may include a transmitter and a receiver The vehicle management device 3 includes a first processor 20 and a first memory 21. The first memory 21 is configured by a volatile or nonvolatile semiconductor memory and/or a hard disk device or the like, for example.

The first processor 20 is a computer including a CPU or the like, for example. The first processor 20 may include a ROM in which a program is written and a RAM for temporary storage of data or the like. Then, the first processor 20 includes, as functional elements or functional units, an information collection unit 23 and an installation management unit 24.

The functional elements provided in the first processor 20 are realized by the first processor 20 which is the computer executing a first program 22 preserved in the first memory 21, for example. Note that the first program 22 can be stored in a computer-readable arbitrary storage medium. Instead, all or a part of the functional elements provided in the first processor 20 can be also configured by hardware including one or more electronic circuit components, respectively.

The information collection unit 23 collects the failure information from the ECU 11 and transmits it to the management server 4. Specifically, the information collection unit 23 collects the failure information from the ECU 11 and transmits it to the management server 4 when the vehicle power switch 18 is switched ON. In addition, the information collection unit 23 may transmit the received failure information to the management server 4 when the failure information is received from the ECU 11 which has found a failure in the period during which the vehicle power switch 18 is ON.

The installation management unit 24 manages the installation of the software program to the ECU 11. In the present embodiment, in particular, the installation management unit 24 installs the software program of the option function for which the execution preparation is determined to be possible in the management server 4, and does not install the software program of the option function for which the execution preparation is determined to be impossible.

Specifically, when the execution preparation instruction is received from the management server 4, the installation management unit 24 downloads the software program required for the execution of the option function from the management server 4 and installs it to the ECU 11 associated with the option function for which the execution preparation is determined to be possible and the execution is permitted according to the received execution preparation instruction. In addition, after the installation is completed, the installation management unit 24 permits the execution of the option function to the associated ECU 11.

Note that, when the software program required for the execution of the option function for which the execution is not permitted in the received execution preparation instruction is already installed to the ECU 11 associated with the option function, the installation management unit 24 prohibits the ECU 11 from executing the option function. For example, when the user U utilizes one option function and then ends the utilization of the option function, the option function for which the execution is not permitted in the execution preparation instruction can be notified to the vehicle management device 3.

In addition, when the software program required for the execution of the option function for which the execution preparation is determined to be possible and the execution is permitted is already installed in the ECU 11 associated with the option function, the installation management unit 24 only permits the execution of the option function to the ECU 11 and does not redundantly install the software program.

For example, when the user U utilizes one option function and then ends the utilization of the option function, the software program of the option function can be kept installed in the ECU 11.

Further, in the present embodiment, the installation management unit 24 installs the software program to the ECU 11 in the period during which the vehicle power switch 18 is OFF. Thus, it is possible to prevent the situation where installation processing of the software program for the option function is performed while the vehicle 2 is traveling and safety of vehicle traveling declines, to one of ECUs 11 that performs the processing required for the traveling of the vehicle 2, for example.

For example, when the execution preparation instruction is received, the installation management unit 24 downloads the software program to be installed to the ECU 11 from the management server 4 and stores it in the first memory 21 or stores it in the corresponding ECU 11. Then, the installation management unit 24 installs the downloaded software program to the corresponding ECU 11 in the period during which the vehicle power switch 18 is OFF.

4. Configuration of Management Server

Figure 3:
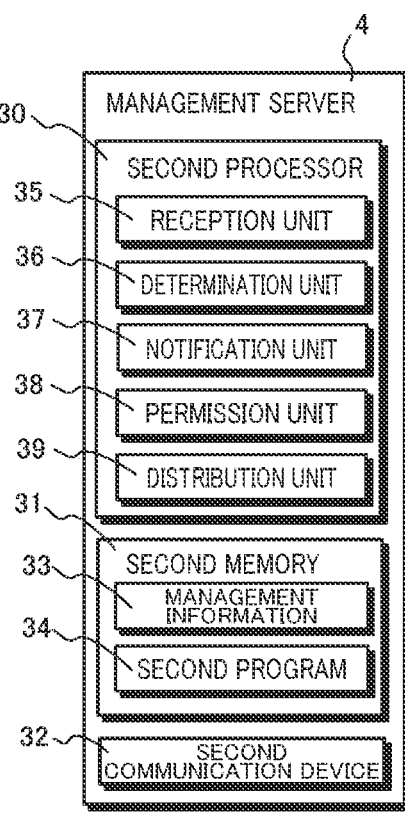
FIG. 3 is a diagram illustrating a configuration of a management server configuring the function management system.

Next, the management server 4 will be explained. FIG. 3 is a diagram illustrating the configuration of the management server 4. The management server 4 includes a second processor 30, a second memory 31, and a second communication device 32. The second communication device 32 is a communication device for the management server 4 to communicate with the vehicle management device 3 and the terminal device 6 via the communication network 5.

The second memory 31 is configured by, for example, a volatile and/or nonvolatile semiconductor memory and/or a hard disk device or the like. In the second memory 31, management information 33 is stored. The management information 33 includes a user ID which identifies the user U, a vehicle ID which identifies the vehicle 2, access information for communicating with the vehicle management device 3 of the vehicle 2, charging information (for example, bank account information or credit card information) for receiving charge payment regarding the option function from the user U, and information about the option function of the vehicle 2.

FIG. 7 is a diagram illustrating one example of the management information 33 stored in the second memory 31. In the illustrated example, the management information 33 is illustrated in a tabular form. From the left of the illustrated table, a first column is the user ID, a second column is the vehicle ID, a third column is the access information, and a fourth column is the charging information.

A fifth column to a ninth column of the illustrated table are the information about the option function of the vehicle 2. The fifth column is a name of the option function, and sixth and seventh columns are lists of the ECUs 11 (associated ECUs) and the instruments 12 (associated instruments) involved in an operation of each option function, respectively. An eighth column indicates information on whether or not the execution preparation of each option function is possible (information of execution preparation propriety), and a ninth column indicates information of whether or not the execution of each option function is permitted (information of execution permission/prohibition).

For example, when there are the plurality of vehicles 2 which are share cars and the plurality of users U can utilize the respective vehicles 2, the management information 33 can hold the information from the first column to the ninth column for each combination of the user U and the vehicle 2, for example.

Here, the user ID, the vehicle ID, the access information and the charging information can be acquired from the user U via the terminal device 6 beforehand and preserved in the management information 33 according to a conventional technology, for example.

Further, the name of the option function in the fifth column, the list of the associated ECUs in the sixth column and the list of the associated instruments in the seventh column are set beforehand according to specifications of the vehicle 2. The information about the execution preparation propriety in the eighth column is preserved or updated by a determination unit 36 of the management server 4 to be described later. The information of the execution permission/prohibition in the ninth column is all "prohibited" by default, and is updated by a permission unit 38 to be described later.

Referring to FIG. 3, the second processor 30 is a computer including a CPU or the like, for example. The second processor 30 may include a ROM in which a program is written and a RAM for temporary storage of data or the like. Then, the second processor 30 includes, as functional elements or functional units, a reception unit 35, the determination unit 36, a notification unit 37, the permission unit 38, and a distribution unit 39.

The functional elements provided in the second processor 30 are realized by the second processor 30 which is the computer executing a second program 34 preserved in the second memory 31, for example. Note that the second program 34 can be stored in a computer-readable arbitrary storage medium. Instead, all or a part of the functional elements provided in the second processor 30 can be also configured by hardware including one or more electronic circuit components, respectively.

The reception unit 35 receives a function list request and a function start request from the terminal device 6 to be described later. When the function list request is received and when the function start request is received, the reception unit 35 refers to the management information 33 in the second memory 31 and authenticates validity of the function list request and the function start request according to the user ID included in the function list request and the function start request, respectively. For example, when the user ID included in the received function list request and the function start request is included in the management information 33, the reception unit 35 determines that the function list request and the function start request are proper.

When the received function list request is proper, the reception unit 35 sends the received function list request to the determination unit 36 and the notification unit 37. Further, when the received function start request is proper, the reception unit 35 sends the received function start request to the notification unit 37 and the permission unit 38.

The determination unit 36 determines whether or not the execution preparation for the utilization start is possible for each of the option functions of the vehicle 2. In the present embodiment, in particular, the determination unit 36 determines that the execution preparation of the option function is possible when a failure is not found in the ECU 11 and the instrument 12 required for the execution of the option function, for each of the option functions based on the failure information transmitted from the information collection unit 23 of the vehicle management device 3 provided in the vehicle 2. In addition, the determination unit 36 determines that the execution preparation of the option function is impossible when a failure is found in the required ECU 11 or instrument 12.

Specifically, the determination unit 36 determines the propriety of the execution preparation of each of the option functions based on the failure information transmitted from the information collection unit 23 of the vehicle management device 3 when the vehicle power switch 18 of the vehicle 2 is turned ON. Thus, the determination unit 36 can determine the execution preparation propriety of the option function based on the latest failure information even in the period during which a communication state between the vehicle management device 3 and the management server 4 changes, such as the time when the vehicle 2 is traveling.

Further, when the failure information from the ECU 11 which has found a failure in the period during which the vehicle power switch 18 of the vehicle 2 is turned ON is received from the vehicle management device 3, the determination unit 36 determines the propriety of the execution preparation of each of the option functions based also on the received failure information. Thus, the determination unit 36 can determine the execution preparation propriety for the option function while reflecting the situation of the failure which has recently occurred in one of the ECUs 11 or one of the instruments 12.

The determination unit 36 updates the management information 33 preserved in the second memory 31 based on the determination result of the execution preparation propriety for each of the option functions.

The notification unit 37 notifies the user U via the terminal device 6. When the function list request from the terminal device 6 is received via the reception unit 35, the notification unit 37 transmits a function list which is the list of the option functions of the vehicle 2 to the terminal device 6 based on the management information 33 in the second memory 31. The terminal device 6 displays the received function list. The user U can select the option function that the user U wants to start the utilization of from the function list displayed at the terminal device 6. The terminal device 6 transmits the function start request for the option function selected by the user to the management server 4.

When the function start request from the terminal device 6 is received via the reception unit 35, the notification unit 37 notifies the user U of the fact that the option function cannot be utilized via the terminal device 6 when the option function requested by the function start request is not the one for which the execution preparation is determined to be possible. Specifically, the notification unit 37 refers to the management information 33 in the second memory 31 when the function start request is received, and acquires the determination result of the execution preparation propriety for the option function requested by the function start request. Then, when it is not determined that the execution preparation is possible for the option function, the notification unit 37 instructs the terminal device 6 and gives a preparation impossibility notice which is a notice indicating that the option function cannot be utilized. The preparation impossibility notice may be a text message and/or a voice message such as "The function cannot be utilized at present. Please consult the nearest dealer.", for example.

When the function start request from the terminal device 6 is received via the reception unit 35, the permission unit

38 performs the charging processing to the user U for the charge related to the utilization of the option function, when the option function requested by the function start request is the one for which the execution preparation is possible. The charge to be charged may be a monthly utilization charge of the option function, for example. When the charging processing to the user U is completed, the permission unit 38 updates the execution permission/prohibition information for the corresponding option function, which is preserved in the management information 33 in the second memory 31, to "permitted", and transmits the execution preparation instruction for the option function to the vehicle 2.

In response to the request from the vehicle management device 3 of the vehicle 2, the distribution unit 39 transmits the software program requested by the vehicle management device 3 to the vehicle management device 3. Note that the software program can be, for example, the one preserved in the second memory 31 (not illustrated in FIG. 3).

5. Configuration of Terminal Device

Next, the terminal device 6 possessed by the user U of the vehicle 2 will be explained. As described above, the terminal device 6 is a smartphone for example in the present embodiment.

Figure 4:
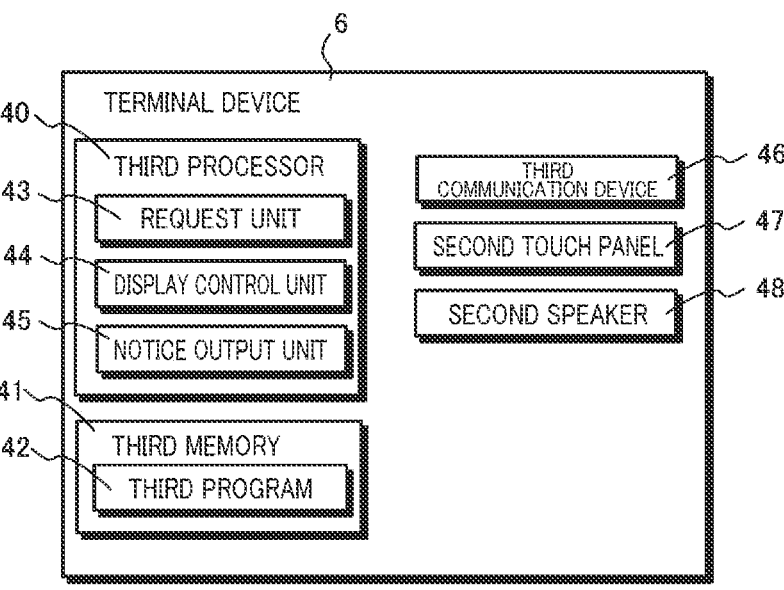
FIG. 4 is a diagram illustrating a configuration of a terminal device configuring the function management system.

FIG. 4 is a diagram illustrating the configuration of the terminal device 6. The terminal device 6 includes a third communication device 46, a second touch panel 47, and a second speaker 48. The third communication device 46 is a wireless communication device for the terminal device 6 to communicate with the management server 4 via the communication network 5. In addition, the third communication device 46 may include a wireless communication device which performs short-range wireless communication such as Bluetooth communication and a cable communication device which performs communication by the cable communication via the USB.

The terminal device 6 further includes a third processor 40 and a third memory 41. The third memory 41 is configured by a volatile and/or nonvolatile semiconductor memory or the like, for example.

The third processor 40 is a computer including a CPU or the like, for example. The third processor 40 may include a ROM in which a program is written and a RAM for temporary storage of data or the like. Then, the third processor 40 includes, as functional elements or functional units, a request unit 43, a display control unit 44, and a notice output unit 45.

The functional elements provided in the third processor 40 are realized by the third processor 40 which is the computer executing a third program 42 preserved in the third memory 41, for example. The third program 42 is an application program for example, and can be used by being downloaded from a program distribution server (not illustrated) or the like connected to the communication network 5 or reading the one stored beforehand in a computer-readable arbitrary storage medium from the storage medium. Instead, all or a part of the functional elements provided in the third processor 40 can be also configured by hardware including one or more electronic circuit components, respectively.

The request unit 43 transmits the function list request for requesting the function list including the list of the option functions of the vehicle 2 to the management server 4 according to the instruction from the user U inputted via the second touch panel 47. The function list request may include the user ID of the user U and the vehicle ID of the vehicle 2. As described above, the management server 4 transmits the function list to the terminal device 6 in response to the reception of the function list request. The display control unit 44 (to be described later) of the terminal device 6 displays the transmitted function list on the second touch panel 47.

The request unit 43 also transmits the function start request for requesting the utilization start for one of the option functions that can be added to the vehicle 2 to the management server 4 according to the instruction from the user U inputted via the second touch panel 47 on which the function list is displayed.

The display control unit 44 displays the function list received from the management server 4 and the other various kinds of information on the second touch panel 47.

The notice output unit 45 displays various kinds of messages including the message of the preparation impossibility notice received from the management server 4 on the second touch panel 47 and/or outputs the messages from the second speaker 48, according to the instruction from the management server 4.

Figure 8:
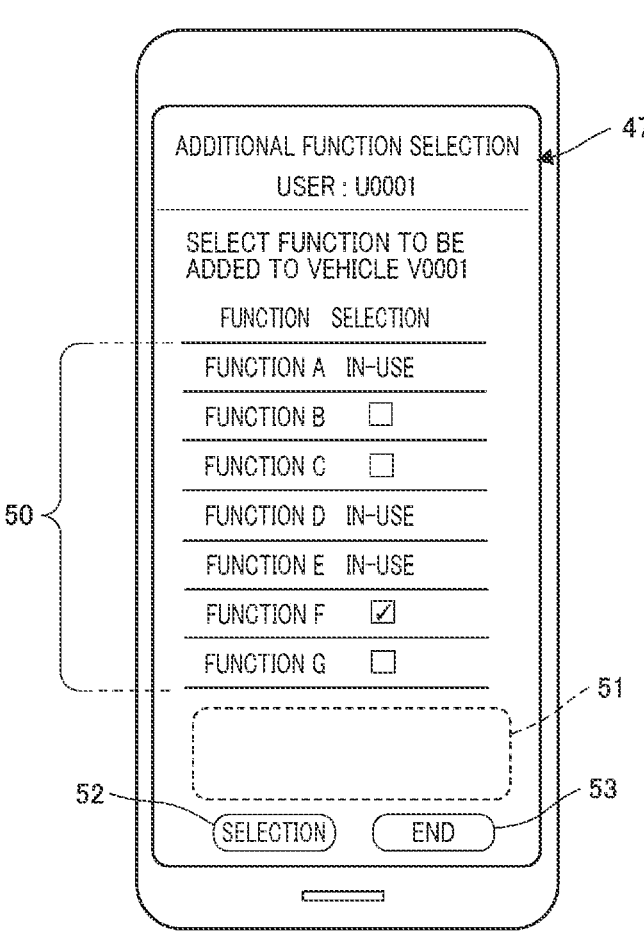
FIG. 8 is a display example of a function list at the terminal device.

FIG. 8 is an example of the function list displayed on the second touch panel 47 by the display control unit 44. The function list is displayed on the second touch panel 47 as one of screens when the third program 42 which is the application program is executed. In the illustrated example, the function list is displayed in a list display area 50. A left column of the function list is the list of the option functions of the vehicle 2 (corresponding to the fifth column of the table in FIG. 7), and a right column indicates the execution permission/prohibition information for each option function (corresponding to the ninth column of the table in FIG. 7). In the right column, "in use" is displayed for the option function (that is, the option function whose utilization is already started by the user U) for which the column of "execution permission/prohibition", that is the ninth column in FIG. 7, is "permitted", and a checkbox is displayed for the option function for which the column of "execution permission/prohibition" in FIG. 7 is "prohibited".

In the list display area 50 illustrated in FIG. 8, the seven option functions from a function A to a function G are displayed. The user U can display the other option functions at the terminal device 6 by performing a swipe operation or a flick operation in the list display area 50.

When the user U touches and checks the checkbox of a desired option function that the user U wants to newly start the utilization of and presses a selection button 52, the request unit 43 transmits the function start request for the corresponding option function to the management server 4. As described above, the notification unit 37 of the management server 4 transmits, in response, the preparation impossibility notice to the terminal device 6 when the option function requested by the function start request is not the one for which the execution preparation is determined to be possible. The notice output unit 45 of the terminal device 6 displays the preparation impossibility notice received from the management server 4 in a message area 51 of the second touch panel 47. In addition, the notice output unit 45 may output the preparation impossibility notice from the second speaker 48 as a voice message.

The user U can end the application by pressing an end button 53.

6. Processing in Function Management System

Next, a procedure of the processing of a function management method performed by the function management system 1 will be explained. The function management system 1 executes the function management method by the preparation determination processing of determining the execution preparation propriety of the option function, and the function start processing of performing the processing for the utilization start of the option function in response to the request from the user U.

[6.1 Preparation Determination Processing]

Figure 5:
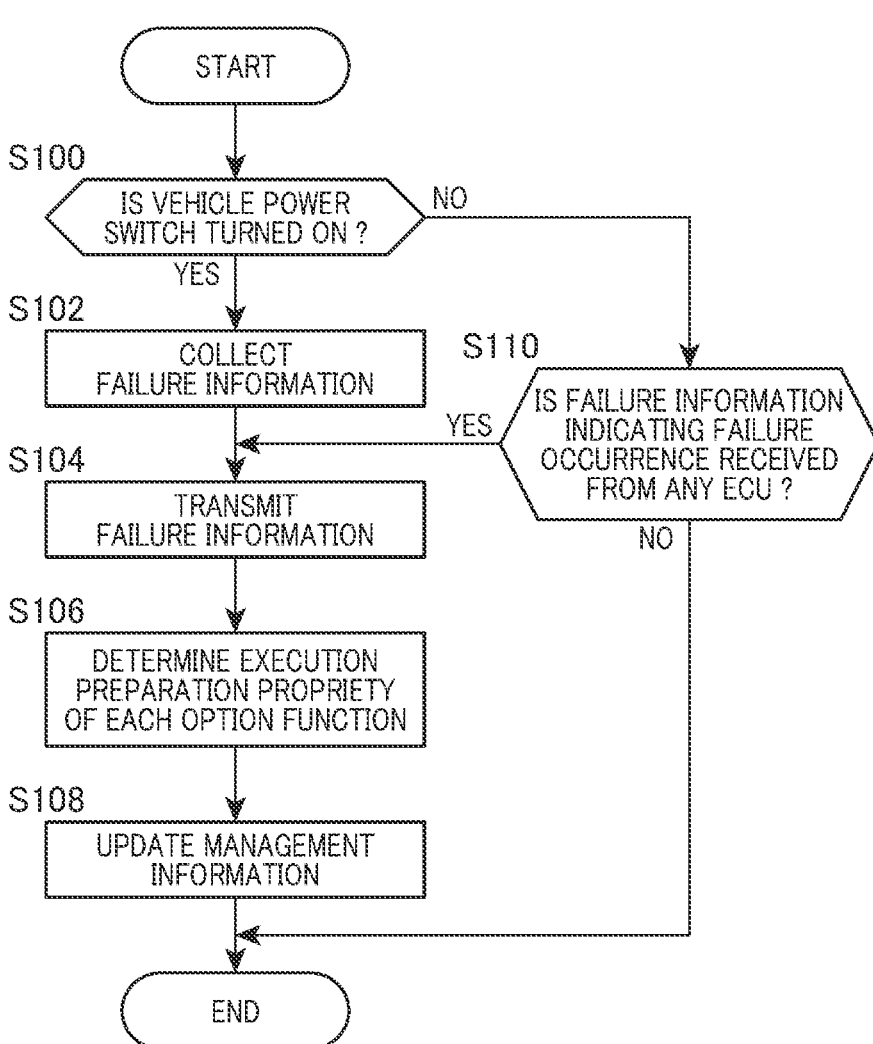
FIG. 5 is a flowchart illustrating a procedure of preparation determination processing executed by the function management system.

FIG. 5 is a flowchart illustrating the procedure of the preparation determination processing. The preparation determination processing is executed by the first processor 20 of the vehicle management device 3 and the second processor 30 of the management server 4, which are the computers of the function management system 1. The processing illustrated in FIG. 5 is repeatedly executed.

In the preparation determination processing, first, the information collection unit 23 of the vehicle management device 3 determines whether or not the vehicle power switch 18 of the vehicle 2 is turned ON (that is, whether or not the vehicle power switch 18 is switched from an OFF state to the ON state) (S100). Then, when the vehicle power switch 18 is turned ON (S100, YES), the information collection unit 23 collects the failure information from each ECU 11 (S102). The information collection unit 23 transmits the collected failure information to the management server 4 (S104).

Next, the determination unit 36 of the management server 4 which receives the failure information determines the execution preparation propriety of each option function of the vehicle 2 based on the failure information received from the vehicle management device 3 (S106). Subsequently, the determination unit 36 updates the management information 33 stored in the second memory 31 based on the determination result (S108), and ends the preparation determination processing.

On the other hand, when the vehicle power switch is not turned ON in step S100 (S100, NO), the information collection unit 23 determines whether or not the failure information indicating failure occurrence is received from any ECU 11 (S110). As described above, each ECU 11 makes the failure diagnosis periodically for example and transmits the failure information to the vehicle management device 3 in the case where the vehicle power switch 18 is in the ON state.

Then, when the failure information indicating the failure occurrence is received from any ECU 11 (S110, YES), the information collection unit 23 shifts the processing to step S104 and transmits the received failure information to the management server 4. On the other hand, when the failure information indicating the failure occurrence is not received (S110, NO), the information collection unit 23 ends the preparation determination processing.

Here, steps S102 and S104 illustrated in FIG. 5 correspond to an information collection step in the present disclosure. In addition, step S106 illustrated in FIG. 5 corresponds to a determination step in the present disclosure.

[6.2 Function Start Processing]

FIG. 6 is a flowchart illustrating the procedure of the function start processing. The function start processing is executed by the first processor 20 of the vehicle management device 3, the second processor 30 of the management server 4 and the third processor 40 of the terminal device 6, which are the computers of the function management system 1. The processing illustrated in FIG. 6 is repeatedly executed.

In the function start processing, first, the reception unit 35 of the management server 4 determines whether or not the proper function list request is received from the terminal device 6 (S200). Then, when the proper function list request is not received (S200, NO), the reception unit 35 returns to step S200 to repeat the processing and stands by for the proper function list request to be received.

On the other hand, when the proper function list request is received (S200, YES), the notification unit 37 of the management server 4 transmits the function list to the terminal device 6 which is a transmission source of the function list request. The display control unit 44 of the terminal device 6 which receives the function list displays the function list on the second touch panel 47 (S202).

Next, the request unit 43 of the terminal device 6 determines whether or not an end operation is performed from the user U (S204). The end operation of the user U may be, for example, pressing the end button 53 displayed on the second touch panel 47 together with the function list. Then, when the end operation is performed (S204, YES), the request unit 43 ends the function start processing.

On the other hand, when the end operation is not performed (S204, NO), the request unit 43 determines whether or not the start request for any one of the option functions is inputted from the user U (S206). As described above, the user U can input the start request for the option function by selecting the option function that the user U wants to start the utilization of by the checkbox from the function list displayed on the second touch panel 47 and pressing the selection button 52.

Then, when the start request for the option function is not inputted (S206, NO), the request unit 43 returns the processing to step S204 to repeat steps S204 and S206, and stands by for the end operation to be performed or the start request for any option function to be inputted.

On the other hand, when the start request for any one of the option functions is inputted (S206, YES), the request unit 43 transmits the function start request for the option function to the management server 4. The notification unit 37 and the permission unit 38 of the management server 4 which receives the function start request determine whether or not the execution preparation is possible for the option function requested by the function start request, based on the management information 33 stored in the second memory 31 (S208).

Then, when the execution preparation of the requested option function is possible (S208, YES), the permission unit 38 updates the execution permission/prohibition information of the requested option function in the management information 33 to "permitted", on condition that the charging processing to the user U is normally performed. In addition, the permission unit 38 transmits the execution preparation instruction for the requested option function to the vehicle 2. Then, when the software program required for the execution of the option function is not installed to the associated ECU 11, the installation management unit 24 of the vehicle management device 3 of the vehicle 2 which receives the execution preparation instruction downloads the required software program from the management server 4 and preserves it in the second memory 31 (S210).

Next, the installation management unit 24 determines whether or not the vehicle power switch 18 of the vehicle 2 is in the OFF state (S212). Then, when the vehicle power switch 18 is not in the OFF state (S212, NO), the installation management unit 24 returns to step S212 to repeat the processing, and stands by for the vehicle power switch 18 to be in the OFF state. On the other hand, when the vehicle power switch 18 is in the OFF state (S212, YES), the installation management unit 24 instructs the ECU 11 associated with the option function instructed by the execution preparation instruction, and performs the execution preparation of the option function (that is, an executable state is attained) (S214).

At the time, when the software program required for the execution of the requested option function is not installed in the associated ECU 11, the installation management unit 24 installs the software program downloaded in step S210 to the associated ECU 11. After the execution of the requested option function is prepared, the installation management unit 24 ends the function start processing.

On the other hand, when the execution preparation of the requested option function is determined to be not possible in step S208 (S208, NO), the notification unit 37 instructs the terminal device 6, outputs the preparation impossibility notice for the requested option function (S216), and shifts the processing to step S204.

7. Other Embodiments

In the embodiment described above, the notification unit 37 of the management server 4 transmits the function list including all the option functions to the terminal device 6 when the function list request is received from the terminal device 6, and presents all the option functions to the user U via the terminal device 6. Instead, the notification unit 37 of the management server 4 may present the option functions for which the execution preparation is determined to be possible in the function list and may not present the option functions for which the execution preparation is determined to be impossible. Specifically, the notification unit 37 can refer to the management information 33 in response to the reception of the function list request from the terminal device 6, for example, create the function list including only the option functions for which the execution preparation is determined to be possible, and transmit the created function list to the terminal device 6.

While the failure information collected by the information collection unit 23 of the vehicle management device 3 includes the information about the failure of the ECU 11 and the instrument 12 in the embodiment described above, the failure information may include the information about the failure of at least the ECU 11 or the instrument 12.

While the software program required for realizing the option function is downloaded from the management server 4 to the vehicle management device 3 in the embodiment described above, the software program may be downloaded from another server device such as a program distribution server (not illustrated) connected to the communication network 5.

While the charging processing and utilization permission are not performed for the option function when the execution preparation is impossible for the option function for which the function start request is transmitted from the terminal device 6 in the embodiment described above, the charging processing and the utilization permission may be performed for the option function under understanding from the user U via the terminal device 6. In this case, the user U can immediately utilize the option function after failure repairing or the like required for the vehicle 2 is performed.

While the charging processing performed by the permission unit 38 of the management server 4 is for the monthly utilization charge of the option function in the embodiment described above, the charging processing may be for a purchase charge of the option function.

In the embodiment described above, the user U requests the utilization start of the option function by the terminal device 6. In addition, the user U may request utilization stop of the option function for which the utilization is already started, by the terminal device 6. The permission unit 38 of the management server 4 which receives the request for the utilization stop can stop charging of the option function, update the execution permission/prohibition information about the option function (the rightmost column of the table in FIG. 7) to "prohibited" in the management information 33, and then instruct the prohibition of the execution of the option function to the vehicle management device 3. The installation management unit 24 of the vehicle management device 3 prohibits the execution of the option function to the associated ECU 11 according to the instruction.

While the terminal device 6 is the terminal device such as a smartphone possessed by the user U in the embodiment described above, the terminal device 6 may be the IVI unit 14 provided in the vehicle 2. In this case, the user U can browse the function list via the first touch panel 15 connected to the IVI unit 14 and select the option function that the user U wants to start the utilization of, when the user U gets in the vehicle 2.

The functional elements other than the distribution unit 39 and the management information 33 provided in the management server 4 may be provided in the vehicle management device 3. In this case, for example, the terminal device 6 and the vehicle management device 3 can communicate via the communication device of the IVI unit 14 without interposing the communication network 5, and execute the function management method.

Note that the present invention is not limited to the configuration of the embodiments described above, and can be implemented in various modes without deviating from the gist.

8. Configurations Supported by Embodiment Described Above

The embodiment described above supports the following configurations.

(Configuration 1) A function management system which manages utilization of option functions in a vehicle, the system including: an information collection unit configured to collect failure information including information about a failure of an electronic controller loaded in the vehicle and/or information about a failure of an instrument controlled by the electronic controller; and a determination unit configured to determine whether or not execution preparation for utilization start is possible for each of the option functions, wherein the determination unit determines that the execution preparation of the option function is impossible when a failure has been found in the electronic controller or the instrument required for execution of the option function, for each of the option functions, based on the failure information.

According to the function management system of configuration 1, since the option function for which the execution preparation cannot be performed due to the failure of the electronic controller or the instrument can be detected prior to a request to utilize the option function from a user, when the utilization is requested, the propriety of the execution preparation of the requested option function is quickly presented to the user and the option function utilization can be facilitated.

(Configuration 2) The function management system according to configuration 1, including: a reception unit configured to receive a request for the utilization start for the option functions from a terminal device; and a notification unit configured to notify a user via the terminal device, wherein the notification unit outputs a notice indicating that the option function cannot be utilized to the user via the terminal device when the execution preparation is determined to be impossible for the option function, when the reception unit receives the request for the utilization start for one of the option functions.

According to the function management system of configuration 2, when the utilization start of the option function is requested from the user, when the execution preparation cannot be performed for the option function due to an instrument failure or the like, the user is notified of that fact so that the user can perform coping by examining other alternative option functions or the like and the option function utilization can be facilitated.

(Configuration 3) The function management system according to configuration 1, including a notification unit configured to present a list of the option functions to a user via a terminal device, wherein the notification unit presents the option functions for which the execution preparation is determined to be possible, and does not present the option functions for which the execution preparation is determined to be impossible, in the list.

According to the function management system of configuration 3, since the option functions for which the execution preparation cannot be performed are not presented to the user, the user can select a desired option function from the presented option functions for which the execution preparation is possible, and the option function utilization can be facilitated.

(Configuration 4) The function management system according to any one of configurations 1-3, wherein the electronic controller makes a self-diagnosis for an operation failure of the electronic controller and/or a failure diagnosis for the instrument controlled by the electronic controller and generates the failure information, and the information collection unit collects the failure information from the electronic controller and transmits the failure information to the determination unit when a power switch of the vehicle is switched ON.

According to the function management system of configuration 4, since the failure information collected when the power switch of the vehicle is switched ON is used, the execution preparation propriety of the option function can be appropriately determined using the latest failure information even in the period during which a communication state of the information collection unit and the vehicle may change, like during traveling of the vehicle.

(Configuration 5) The function management system according to configuration 4, wherein the information collection unit further transmits, to the determination unit, the failure information received from the electronic controller which has found a failure of the electronic controller and/or the instrument in a period during which the power switch of the vehicle is ON.

According to the function management system of configuration 5, the execution preparation propriety of the option function can be determined reflecting the situation of the failure which has recently occurred.

(Configuration 6) The function management system according to any one of configurations 1-5, including an installation management unit configured to manage installation of a software program required for execution of the option function to the electronic controller, wherein the installation management unit installs the software program of the option function for which the execution preparation is determined to be possible, and does not install the software program of the option function for which the execution preparation is determined to be impossible.

According to the function management system of configuration 6, the unnecessary software program installation is avoided, and the processing loads can be reduced.

(Configuration 7) The function management system according to configuration 6, wherein the installation management unit installs the software program required for the execution of the option function to the electronic controller in a period during which a power switch of the vehicle is turned OFF.

According to the function management system of configuration 7, it is possible to prevent the situation where installation processing of the software program for the option function is performed to the electronic controller required for vehicle traveling while the vehicle is traveling and safety of the vehicle traveling declines, for example.

(Configuration 8) The function management system according to any one of configuration 1-7, including: a vehicle management device loaded in the vehicle and provided with the information collection unit; and a management server which is a server device provided outside the vehicle and provided with the determination unit.

According to the function management system of configuration 8, since the determination of the execution preparation propriety for the option function is processed in the server device outside the vehicle, the processing in the vehicle management device which is an in-vehicle device can be reduced.

(Configuration 9) A function management method performed by a computer of a function management system which manages utilization of option functions in a vehicle, the method including: an information collection step of collecting failure information including information about a failure of an electronic controller loaded in the vehicle and/or information about a failure of an instrument controlled by the electronic controller; and a determination step of determining whether or not execution preparation for utilization start is possible for each of the option functions, wherein, in the determination step, the execution preparation of the option function is determined to be impossible when a failure has been found in the electronic controller or the instrument required for execution of the option function, for each of the option functions, based on the failure information.

According to the function management method of configuration 9, since the option function for which the execution preparation cannot be performed due to the failure of the electronic controller or the instrument can be detected prior to the request to utilize the option function from the user, when the utilization is requested, the propriety of the execution preparation of the requested option function is quickly presented to the user and the option function utilization can be facilitated.

REFERENCE SIGNS LIST

1 . . . function management system, 2 . . . vehicle, 3 . . . vehicle management device, 4 . . . management server, 5 . . . communication network, 6 . . . terminal device, 10 . . . in-vehicle network bus, 11 . . . ECU, 11a . . . aECU, 11b . . . bECU, 11c . . . CECU, 11d . . . dECU, 12 . . . instrument, 12a . . . instrument a, 12b . . . instrument b, 12c . . . instrument c, 12d . . . instrument d, 13 . . . TCU, 14 . . . IVI unit, 15 . . . first touch panel, 16 . . . first speaker, 17 . . . first communication device, 18 . . . vehicle power switch, 20 . . . first processor, 21 . . . first memory, 22 . . .

18 first program, 23 . . . information collection unit, 24 . . . installation management unit, 30 . . . second processor, 31 . . . second memory, 32 . . . second communication device, 33 . . . management information, 34 . . . second program, 35 . . . reception unit, 36 . . . determination unit, 37 . . . notification unit, 38 . . . permission unit, 39 . . . distribution unit, 40 . . . third processor, 41 . . . third memory, 42 . . . third program, 43 . . . request unit, 44 . . . display control unit, 45 . . . notice output unit, 46 . . . third communication device, 47 . . . second touch panel, 48 . . . second speaker, 50 . . . list display area, 51 . . . message area, 52 . . . selection button, 53 . . . end button.

What is claimed is:

1. A function management system which manages utilization of option functions that are software programs in a vehicle, the system comprising:
   an information collection unit configured to collect failure information including information about a failure of an electronic controller loaded in the vehicle and/or information about a failure of an instrument controlled by the electronic controller; and
   a determination unit configured to determine whether or not execution preparation for utilization start is possible for each of the option functions,
   wherein the determination unit determines that the execution preparation of the option function is impossible when a failure has been found in the electronic controller or the instrument required for execution of the option function, for each of the option functions, based on the failure information,
   the function management system further includes a permission unit that performs charging processing for a utilization charge of the option function for which the execution preparation is determined to be possible and that then instructs the execution preparation for the option function on which the charging processing has been performed.

2. The function management system according to claim 1, comprising:
   a reception unit configured to receive a request for the utilization start for the option functions from a terminal device; and
   a notification unit configured to notify a user via the terminal device,
   wherein the notification unit outputs a notice indicating that the option function cannot be utilized to the user via the terminal device when the execution preparation is determined to be impossible for the option function, when the reception unit receives the request for the utilization start for one of the option functions.

3. The function management system according to claim 1, comprising
   a notification unit configured to present a list of the option functions to a user via a terminal device,
   wherein the notification unit presents the option functions for which the execution preparation is determined to be possible, and does not present the option functions for which the execution preparation is determined to be impossible, in the list.

4. The function management system according to claim 1, wherein
   the electronic controller makes a self-diagnosis for an operation failure of the electronic controller and/or a failure diagnosis for the instrument controlled by the electronic controller and generates the failure information, and the information collection unit collects the failure information from the electronic controller and transmits the failure information to the determination unit when a power switch of the vehicle is switched ON.

5. The function management system according to claim 4, wherein the information collection unit further transmits, to the determination unit, the failure information received from the electronic controller which has found a failure of the electronic controller and/or the instrument in a period during which the power switch of the vehicle is ON.

6. The function management system according to claim 1, comprising an installation management unit configured to manage installation of a software program required for execution of the option function to the electronic controller, wherein the installation management unit installs the software program of the option function for which the execution preparation is determined to be possible, and does not install the software program of the option function for which the execution preparation is determined to be impossible.

7. The function management system according to claim 6, wherein the installation management unit installs the software program required for the execution of the option function to the electronic controller in a period during which a power switch of the vehicle is turned OFF.

8. The function management system according to claim 1, comprising:

a vehicle management device loaded in the vehicle and provided with the information collection unit; and a management server which is a server device provided outside the vehicle and provided with the determination unit.

9. A function management method performed by a computer of a function management system which manages utilization of option functions that are software programs in a vehicle, the method comprising:

an information collection step of collecting failure information including information about a failure of an electronic controller loaded in the vehicle and/or information about a failure of an instrument controlled by the electronic controller; and a determination step of determining whether or not execution preparation for utilization start is possible for each of the option functions, wherein, in the determination step, the execution preparation of the option function is determined to be impossible when a failure has been found in the electronic controller or the instrument required for execution of the option function, for each of the option functions, based on the failure information, the function management method further includes a permission step of performing charging processing for a utilization charge of the option function for which the execution preparation is determined to be possible and then instructing the execution preparation for the option function on which the charging processing has been performed.

* * * * *